United States Patent [19]
Allen, Jr.

[11] Patent Number: 6,065,782
[45] Date of Patent: May 23, 2000

[54] PIPE JOINT SUPPORT DEVICE

[76] Inventor: Leslie L. Allen, Jr., 19415 Creekround Ave., Baton Rouge, La. 70817

[21] Appl. No.: 08/987,265

[22] Filed: Dec. 9, 1997

[51] Int. Cl.[7] .................................................. F16L 21/06
[52] U.S. Cl. ...................... 285/114; 285/133.11; 285/420
[58] Field of Search ................................. 285/114, 133.5, 285/133.11, 420, 61, FOR 137, FOR 138

[56] References Cited

U.S. PATENT DOCUMENTS

| | | | |
|---|---|---|---|
| 714,508 | 11/1902 | Moser | 285/420 X |
| 1,232,447 | 7/1917 | Horne | 285/133.11 |
| 1,671,789 | 5/1928 | Smith | 285/133.11 X |
| 2,863,677 | 12/1958 | Hauch et al. | 285/114 X |
| 4,432,571 | 2/1984 | Davis | 285/420 X |
| 5,468,025 | 11/1995 | Adinolfe et al. | 285/114 |

*Primary Examiner*—Lynne H. Browne
*Assistant Examiner*—David E. Bochna
*Attorney, Agent, or Firm*—Sieberth & Patty, L.L.C.

[57] ABSTRACT

Device for supporting a pipe joint which joins a substantially vertical pipe with at least one substantially horizontal pipe. In one embodiment, the device comprises (a) a base member, (b) a clamp sized and configured to clamp the vertical pipe, and (c) at least one arm member which is attached at one end to the base member and attached at the other end to the clamp. The devices of the invention provide support or reinforcement to conventional pipe joints to enable those joints to better withstand gravitational and other forces over extended periods of time. Improved underground pipe systems employing pipe joints, as well as methods for providing support to pipe joints, are also described.

22 Claims, 9 Drawing Sheets

PIPE JOINT SUPPORT DEVICE

TECHNICAL FIELD

This invention relates to devices which support pipe joints.

BACKGROUND

Underground sewer and water systems typically include numerous joints where pipes that are disposed in various spacial relationships to one another are joined together. Such joints often involve joining a vertical or substantially vertical pipe with at least one horizontal or substantially horizontal pipe. One example of such a joint is commonly known as a T-joint, which is actually a joint in the shaped of an inverted "T", formed to join a single vertical or substantially vertical pipe with two horizontal or substantially horizontal pipes. Over time, the weight of the dirt placed on and around such a joint and the pipes connected to it, and the weight of the pipe contents when in use, place tremendous stress upon the joint, particularly at the point of contact between the vertical or substantially vertical pipe and the joint. Given the large number of these types of pipe joints in municipal, commercial and residential infrastructure, substantial costs are incurred to replace cracked or crushed joints which have failed to withstand these forces.

A need therefore exists for an efficient way to provide support or reinforcement to conventional pipe joints to enable those joints to withstand such forces over extended periods of time.

SUMMARY OF THE INVENTION

The present invention is deemed to satisfy this need in a highly efficient way by providing, among other things, a device for supporting a pipe joint which joins a substantially vertical pipe with at least one substantially horizontal pipe. As used in this specification and the appended claims, "substantially vertical" when used with reference to a pipe means that the pipe is at an angle from vertical which is no greater than about 35 degrees, and preferably no greater than 15 degrees. Likewise, as used in this specification and the appended claims, "substantially horizontal" when used with reference to a pipe means that the pipe is at an angle above or below horizontal which is no greater than about 35 degrees, and preferably no greater than about 15 degrees.

In one embodiment of this invention, the device comprises
a) a base member,
b) a clamp sized and configured to clamp the vertical pipe, and
c) at least one arm member which is attached at one end to the base member and attached at the other end to the clamp.

Although it is not required, the base member of the device preferably defines at least one seat for receiving a portion of the pipe joint. Such a configuration can facilitate installation of the device without requiring additional earth excavation, which can be important in areas in which space is limited.

In another embodiment of the invention, the base member comprises a first base member portion and a second base member portion, the portions being either pivotally attached to one another or detachably attached to one another, or both. This highly advantageous feature permits the base member to be disassembled or pivotally opened to facilitate installation and removal of the device from the subject joint. Such features are of particular importance when the device is being installed on a pipe joint located in a cramped excavation site or the like. Typically, the pipe joint involved will be an inverted T-type pipe joint which joins a substantially vertical pipe with two substantially horizontal pipes, the vertical pipe bringing a downward flow into the horizontal flow between the two horizontal pipes. However, other types of pipe joints may be used with devices of this invention, so long as at least one substantially vertical pipe is being joined with at least one substantially horizontal pipe. As will be appreciated by those of ordinary skill in the art, gravitational and other forces which may cause the substantially vertical pipe to place substantial downward force on the pipe joint, especially at the point of contact between the lower end of the vertical pipe and the pipe joint, may be at least partially diverted around the pipe joint by devices of this invention. In this way, the useful life of the joint is increased substantially while the costs associated with maintaining such joints and related pipe systems is reduced substantially.

In a preferred embodiment, this invention provides a device for supporting a pipe joint which joins a substantially vertical pipe with two substantially horizontal pipes, the device comprising:
a) a base member which defines at least one seat for receiving a lower portion of the pipe joint,
b) a clamp sized and configured to clamp the vertical pipe, and
c) two arm members each of which is attached at one end to the base member and attached at the other end to the clamp.

Preferably, the base member defines at least two seats for receiving a lower portion of the pipe joint. The base member preferably comprises a substantially horizontal portion connecting each of the seats to one another to increase the stability of the base member. At least a portion of the surface of the clamp which contacts the vertical pipe preferably includes threading which runs in a direction substantially perpendicular to the longitudinal axis of the vertical pipe when the clamp is installed on the vertical pipe. This threading enables the clamp to better grip the pipe, especially when the pipe is made of a polymeric or plastic material (e.g., polyvinyl chloride), so that gravitational forces may be efficiently transferred from the substantially vertical pipe to the base member via the clamp and the arm members which extend between the base member and the clamp.

This invention also provides a method for supporting a pipe joint at which a substantially vertical pipe intersects with at least one substantially horizontal pipe, the method comprising attaching a clamp to the vertical pipe, providing a base member substantially below the pipe joint, and connecting the clamp to the base member so that downward force may be transferred from the clamp to the base member.

Furthermore, this invention provides an improvement to a system of underground pipes which comprises at least one substantially vertical pipe, at least one substantially horizontal pipe, and a pipe joint to which the substantially vertical pipe and the substantially horizontal pipe are connected.

These and other embodiments and features of the invention will become still further apparent from the ensuing description, appended claims and accompanying drawings.

BRIEF DESCRIPTION OF THE DRAWINGS

In each of the above figures, like numerals are used to refer to like or functionally like parts among the several figures. Also, in each of the above figures, pipes and pipe joints are illustrated in phantom view.

DETAILED DESCRIPTION OF THE INVENTION

As may now be appreciated, the devices and methods of this invention provide substantial reinforcement to pipe joints undergoing stress from the surrounding soil and/or the weight of material flowing through the pipes and into the joint. By providing this reinforcement, the devices and methods of this invention provide a way to substantially improve the longevity of the pipe joint structure, which in turn substantially lowers the costs of maintaining the infrastructure employing the pipe joints.

Figure 1:
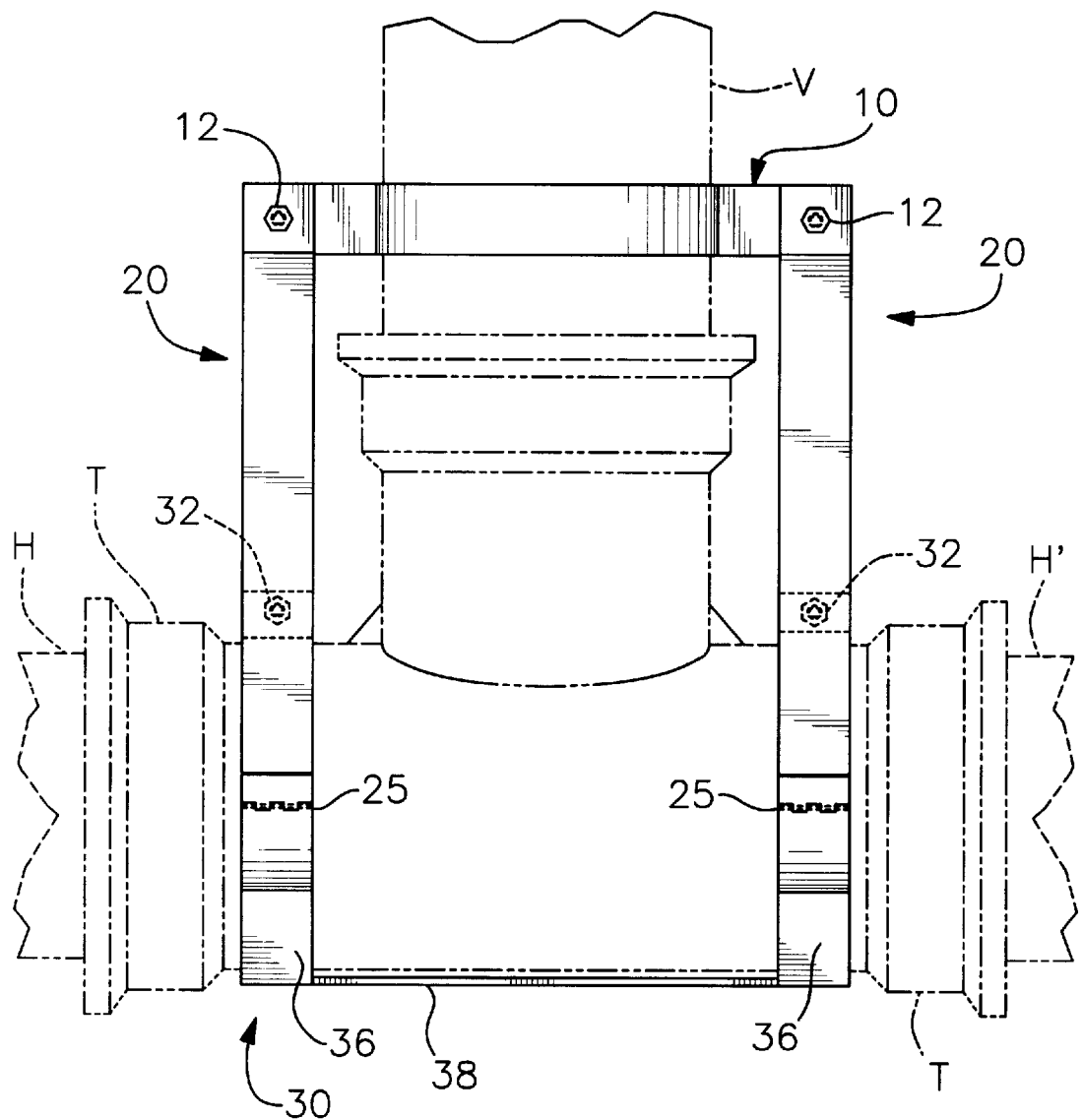
FIG. 1 is a side, partially phantom view of one embodiment of this invention.
Figure 2:
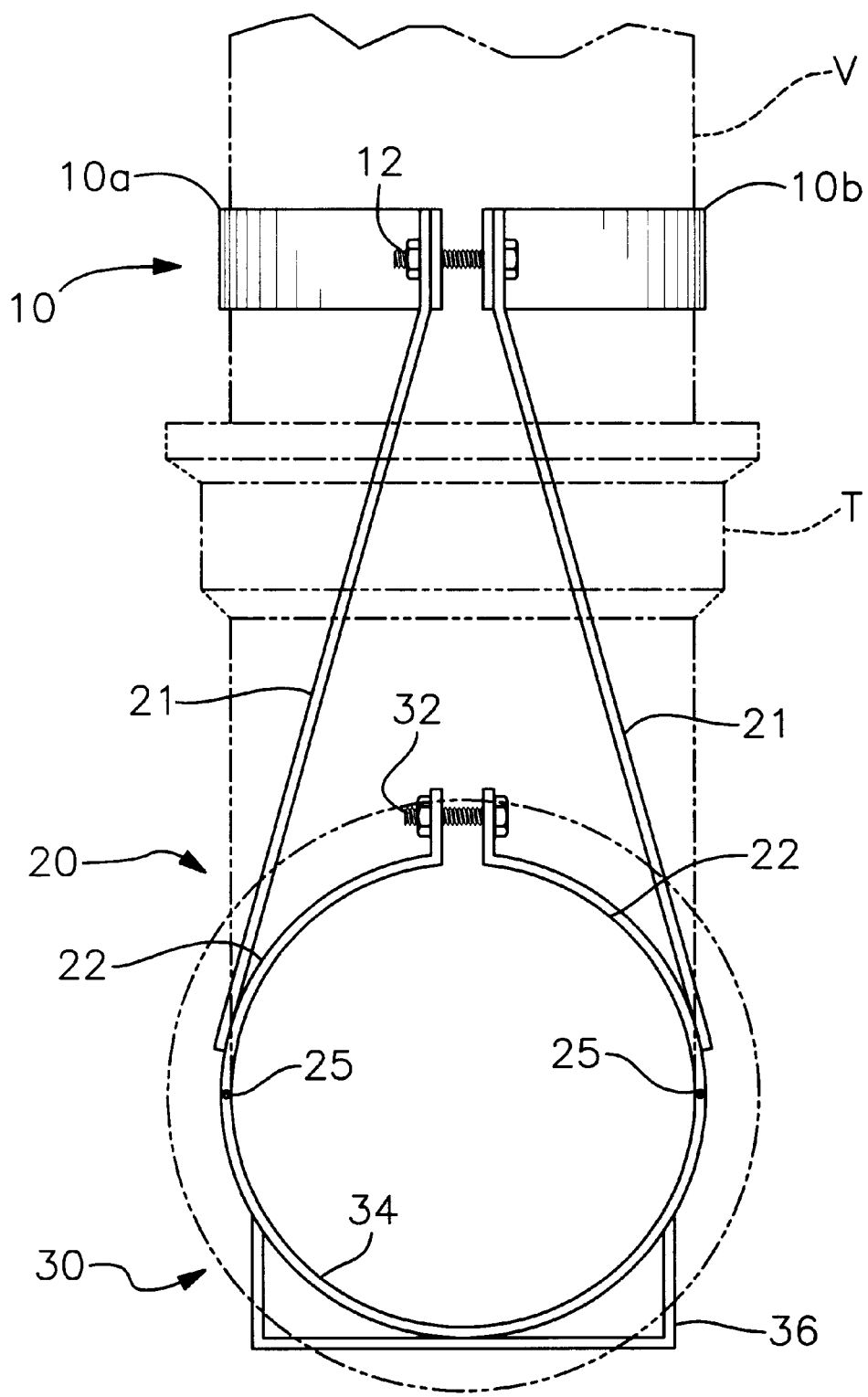
FIG. 2 is another side view of the device of FIG. 1.
Figure 3:
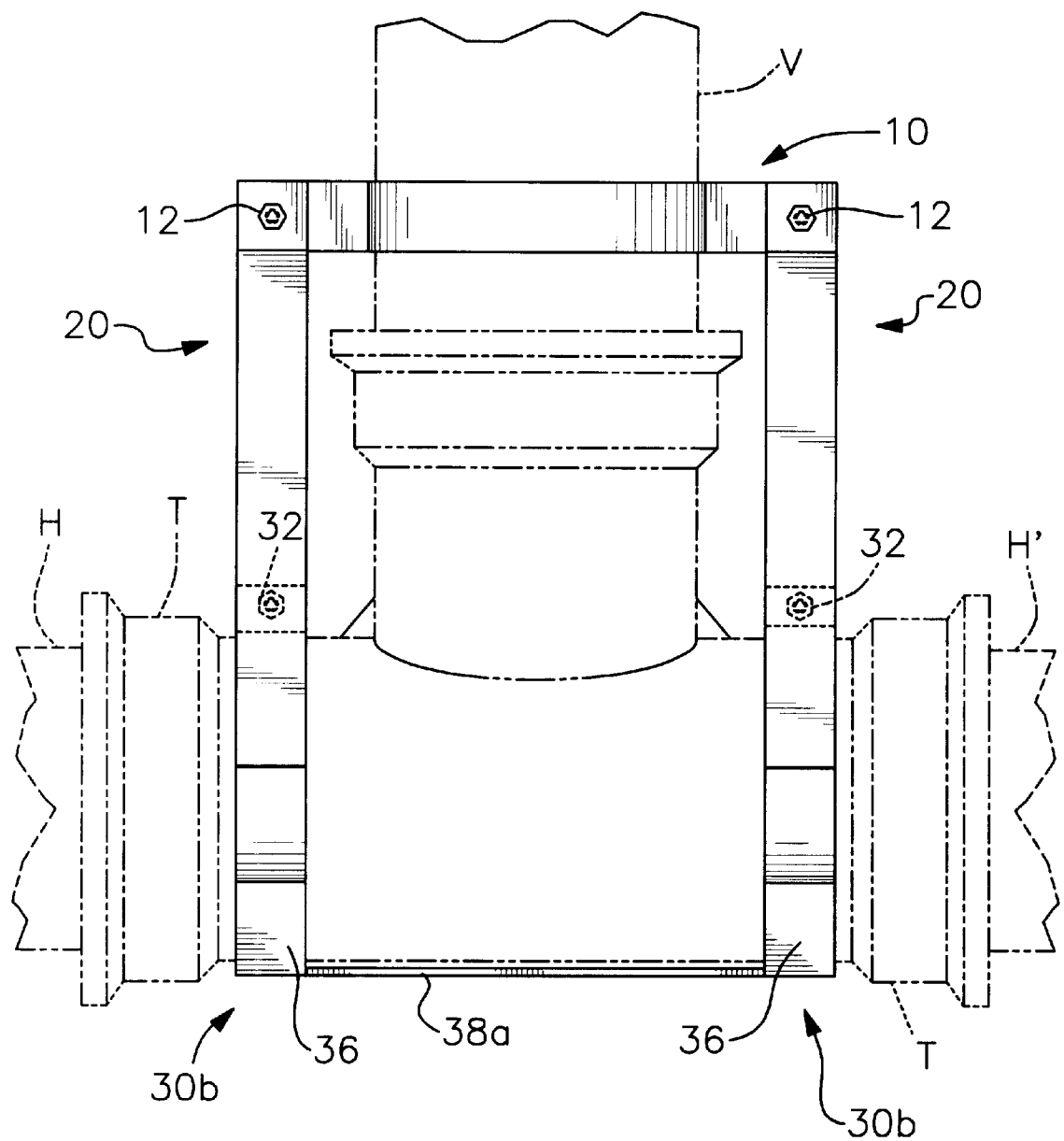
FIG. 3 is a side, partially phantom view of a second embodiment of this invention.
Figure 4:
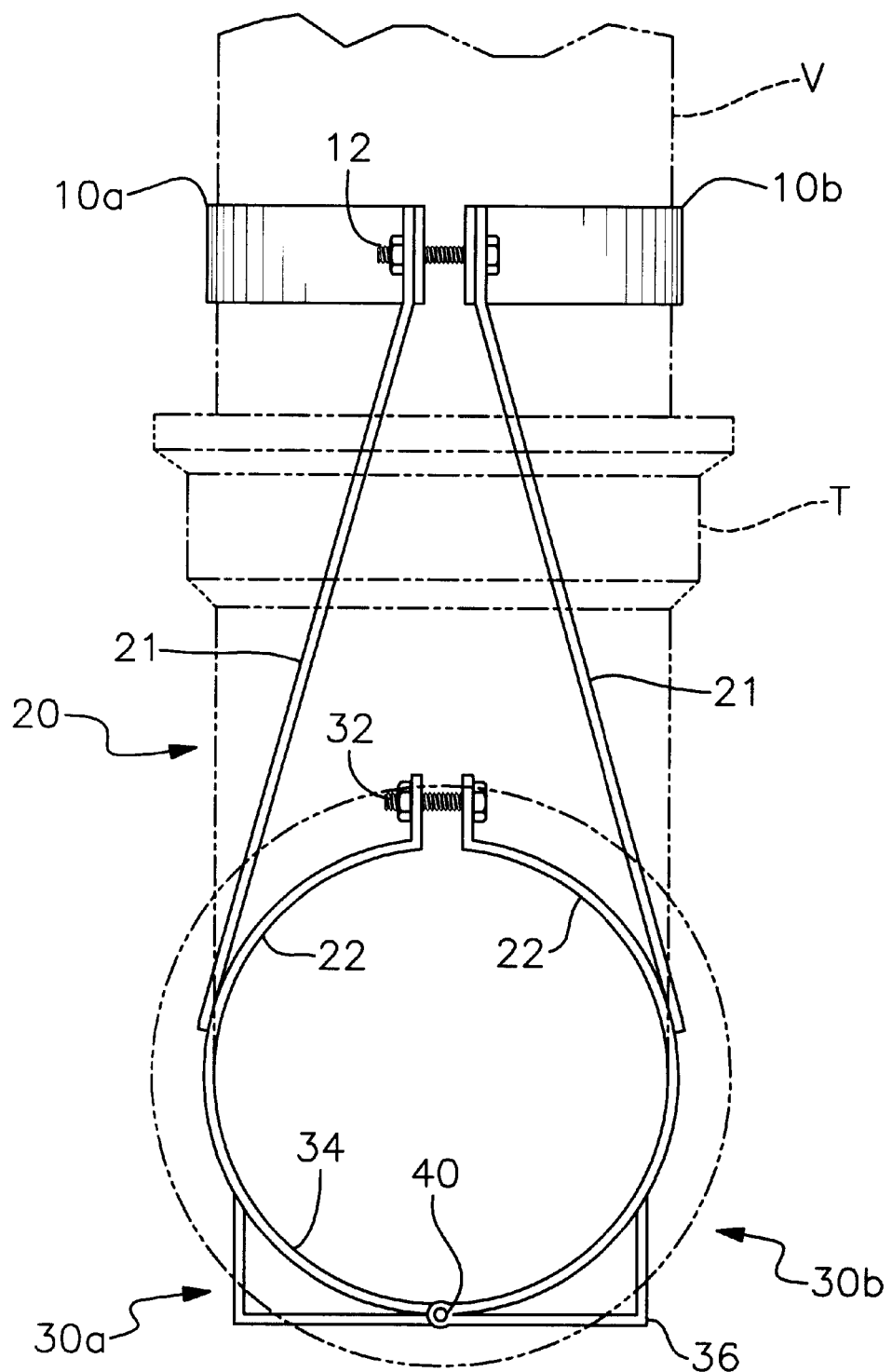
FIG. 4 is another side view of the device of FIG. 3.
Figure 5:
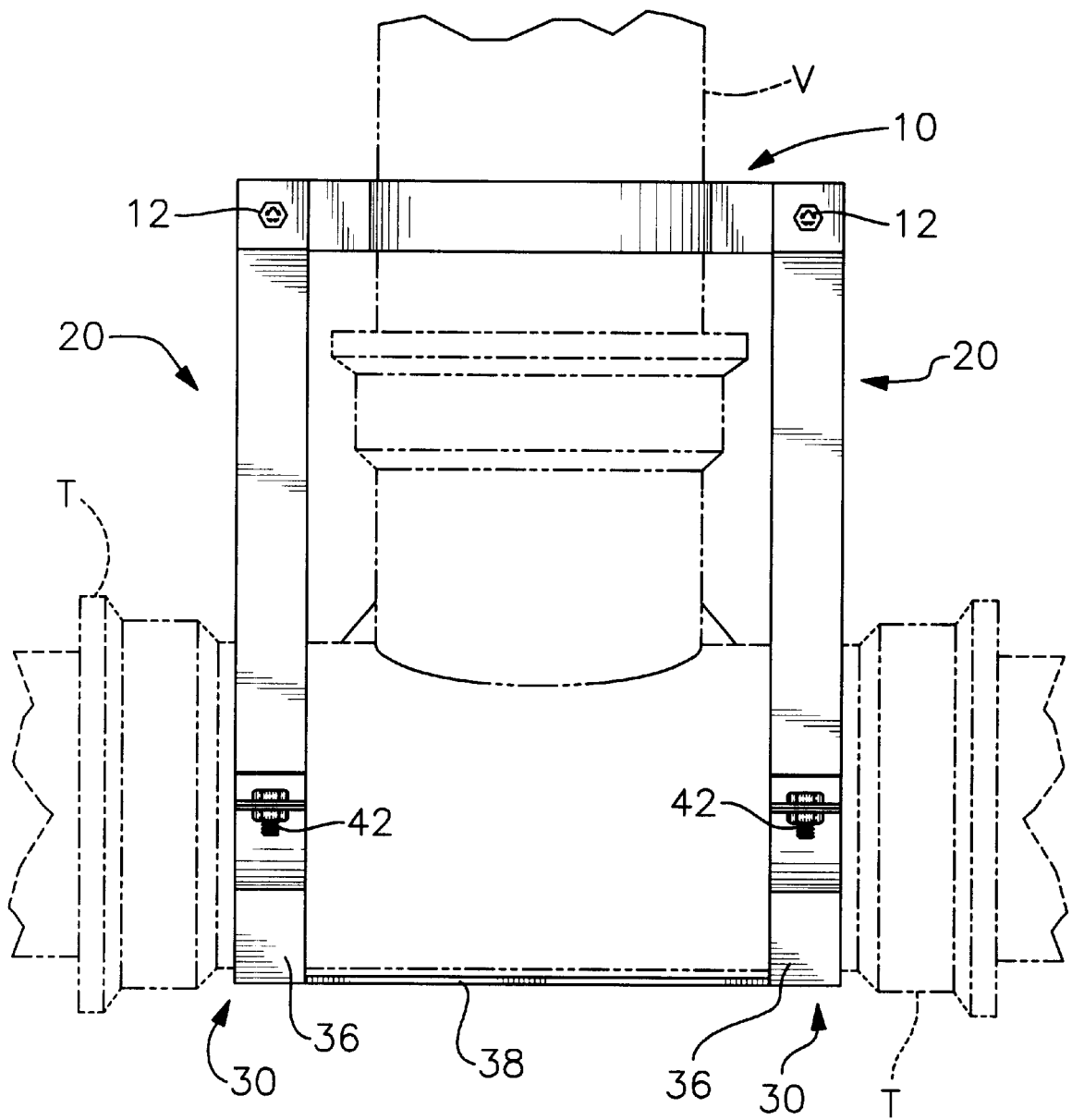
FIG. 5 is a side, partially phantom view of a third embodiment of this invention.
Figure 6:
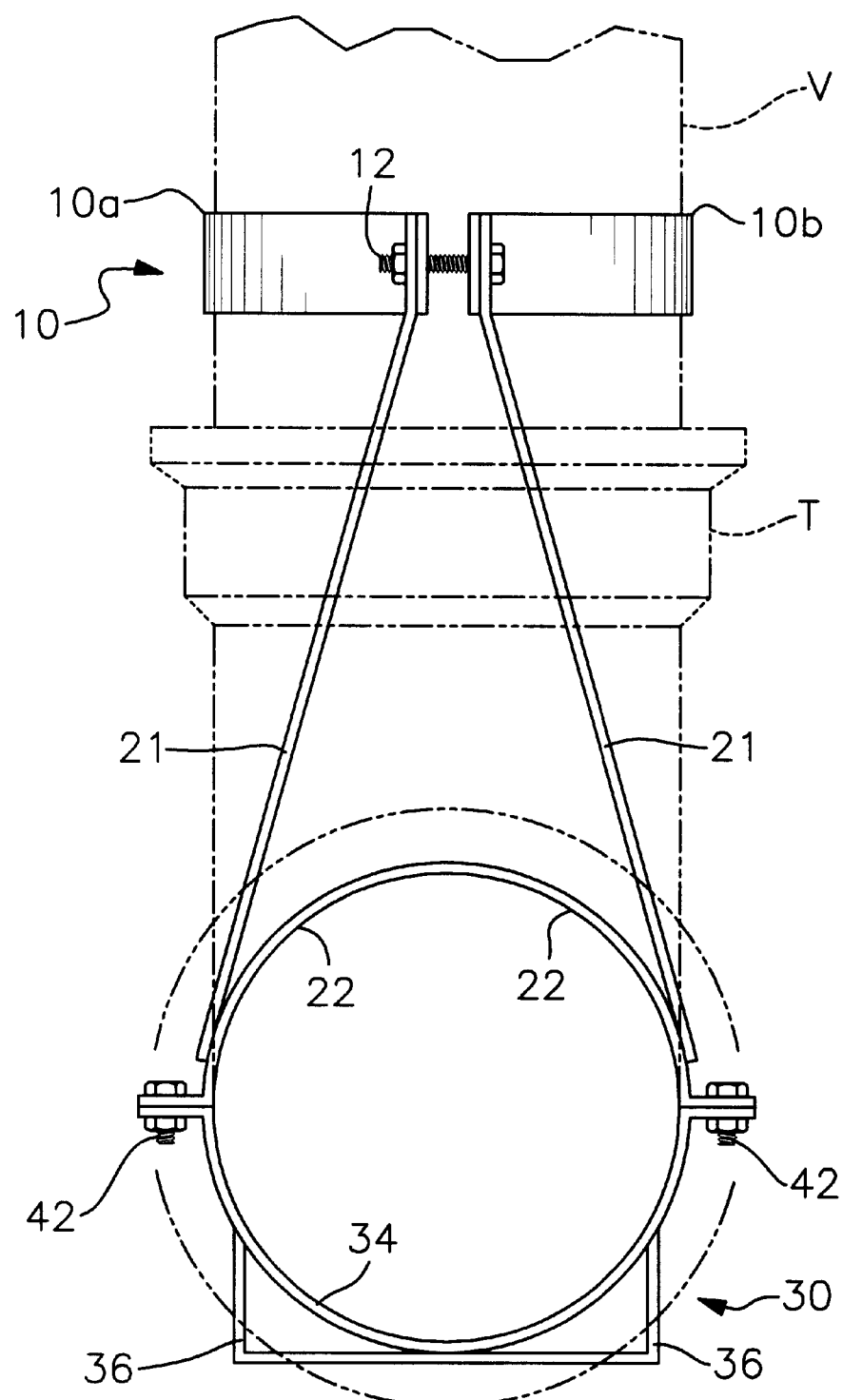
FIG. 6 is another side view of the device of FIG. 5.

The accompanying figures are intended to illustrate preferred embodiments of this invention. In particular, FIGS. 1 and 2 illustrate one preferred embodiment of this invention, FIGS. 3 and 4 illustrate a second preferred embodiment of this invention, and FIGS. 5 and 6 illustrate a third preferred embodiment of this invention. With reference to the embodiment of FIGS. 1 and 2, as depicted the device of this invention is connected to a pipe joint T which is, in turn, connected to a substantially vertical pipe V, a substantially horizontal pipe H and a substantially horizontal pipe H'. Typically, pipe joint T and pipes V, H, and H' are part of a larger system of underground pipes or conduits, e.g., a sewer system, which contains numerous pipe joints which undergo the stress of many years of use while buried under several feet of soil. The device depicted in FIGS. 1 and 2 is comprised of a clamp 10, two arm members 20, 20, and a base member 30. Clamp 10 comprises two identical halves, 10a and 10b, which are rigidly clamped together by two nut and bolt sets 12, 12 to vertical pipe V, which is in turn connected to pipe joint T. Each arm member 20 comprises two identical arm halves, each arm half being formed by a flat bar 21 and an arcuate segment 22, each flat bar 21 being soldered at one end to a respective segment 22. The other free end of each flat bar 21 is detachably attached to clamp 10 and to a corresponding free end of another flat bar 21 of the corresponding arm half by the respective nut and bolt set 12. Each arcuate segment 22 is pivotally attached at one end to base member 30 by a respective hinge 25, and detachably attached at the other end to a corresponding end of another arcuate segment 22 by a corresponding nut and bolt set 32.

Base member 30 includes two arcuate segments 34 (only one shown in FIG. 2), each defining a seat for receiving or cradling a lower portion of pipe joint T. Base member 30 further includes two support segments 36,36, each supporting a corresponding arcuate segment 34, and a horizontal portion in the form of a flat bar 38, which extends between the support segments 36,36 to provide added stability to base member 30. Nut and bolt sets 12,12 and 32,32 may be removed to permit the halves of each arm member 20 to pivot on their respective hinge 25 so that the halves of arm member 20 may be separated from one another to facilitate the device's installation on and removal from the joint.

FIGS. 3 and 4 illustrate a second preferred embodiment of this invention. This embodiment differs from the embodiment of FIGS. 1 and 2 in that each arcuate segment 34 and its corresponding support segment 36 have been split in half, effectively forming a first base member portion 30a and a second base member portion 30b, each base member portion being reattached to the other by a hinge 40 so that portions 30a and 30b are pivotally attached to one another. In addition, each of the arcuate segments 22 is integrally attached to arcuate segment 34 so that hinges 25 of FIGS. 1 and 2 are no longer present. Nut and bolt sets 12,12 and 32,32 may be removed to permit the corresponding halves of each arm member 20 and the corresponding base member portions 30a and 30b to pivot about their respective hinge 40 so that the corresponding halves of each arm member 20 may be separated from one another and simultaneously the corresponding base member portions 30a and 30b may be separated from one another, thereby facilitating the device's installation on and removal from the joint.

A third embodiment of this invention is shown in FIGS. 5 and 6. This embodiment differs from the embodiment of FIGS. 1 and 2 in that arcuate segments 22 at one of their corresponding ends are integrally attached to each another rather than being detachably attached by nut and bolt set 32 (FIGS. 1 and 2), and at the other corresponding ends are separately and detachably attached to opposite ends of arcuate segment 34 by a corresponding nut and bolt set 42. Thus, nut and bolt sets 42,42 may be removed to permit each arm member 20 to be removed from its position above base member 30, thereby facilitating the device's installation on and removal from the joint. Once the base member is in place below joint T, each arm member 20 can be reattached quickly and easily.

Figure 7A:
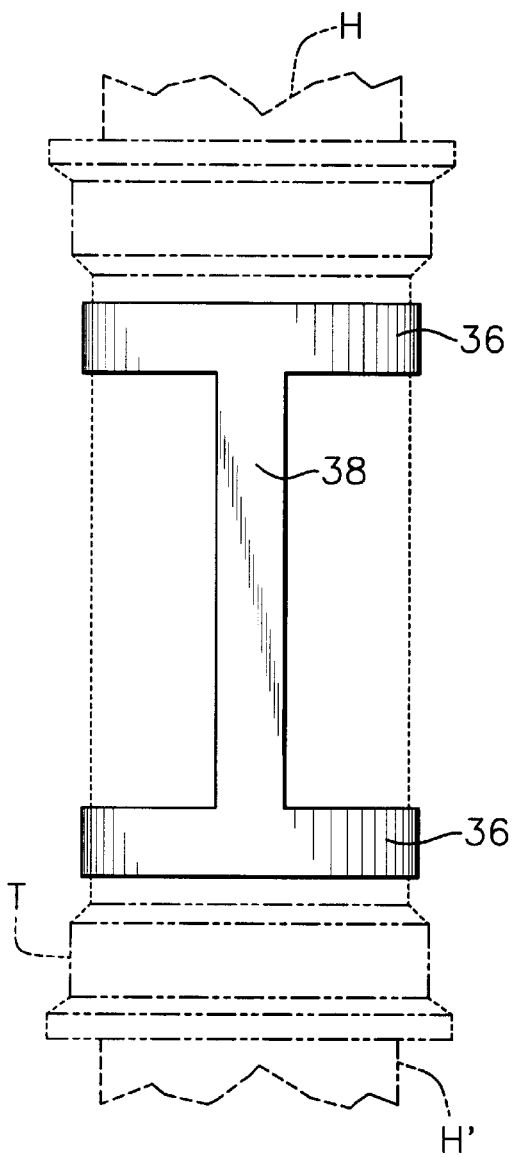
FIGS. 7A, 7B, and 7C illustrate bottom plan views of three alternative embodiments of this invention.
Figure 7B:
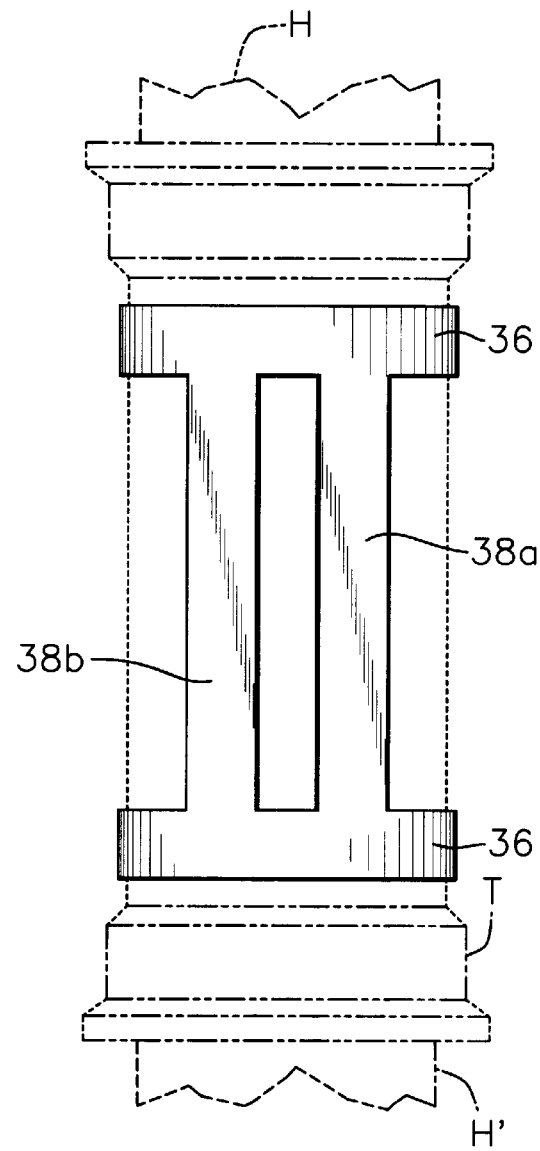
Figure 7C:
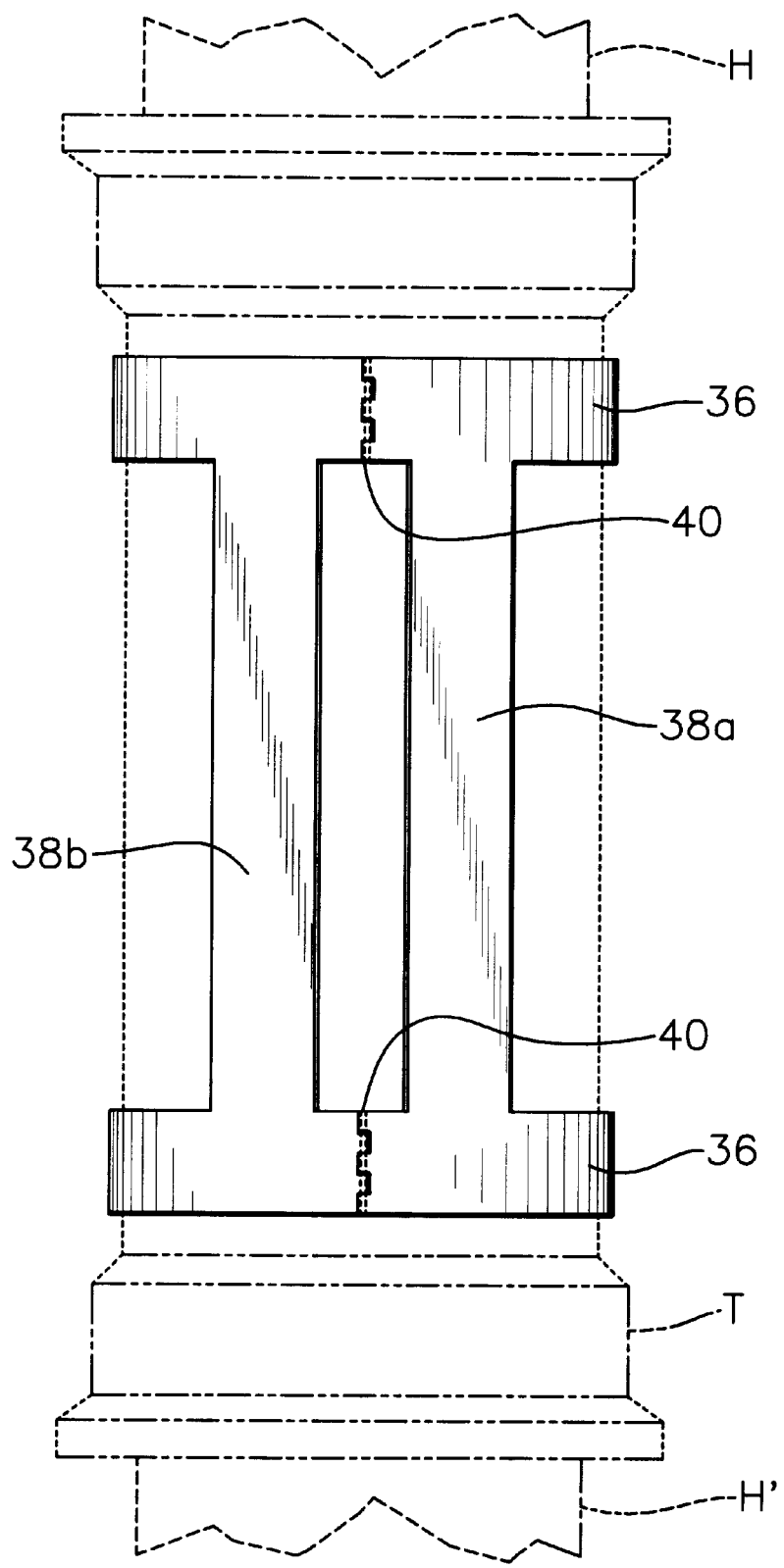

FIGS. 7A, 7B, and 7C illustrate different preferred embodiments of the base member of the device of this invention. The horizontal portion of the base member which extends between support segments 36,36 to provide added stability to base member 30 may take various forms in preferred embodiments of this invention. As previous described and as seen in FIGS. 1, 5, and 7A, the horizontal portion of one preferred embodiment takes the form of the singular flat bar 38, or, as seen in FIG. 7B, for additional stability the horizontal portion is comprised of two separate flat bars 38a and 38b. Similarly, in another preferred embodiment seen in FIGS. 3, 4, and 7C, the base member of the device comprises first base member portions 30a and second base member portions 30b, corresponding portions 30a and 30b being pivotally attached to one another by respective hinges 40, and bars 38a and 38b for the horizontal, stabilizing portion of the base member. While not required, the horizontal portion of the base members depicted provide the advantage of a stable base member which may be called upon to bear considerable strain during use of the device.

The arm member of this invention may take numerous shapes and configurations, depending only upon the strength considerations necessary for the device to perform the function described herein. Devices of this invention should have at least one arm member, and preferably have at least two arm members. However, a single arm member could be used and may be particularly suitable under conditions where such a configuration is appropriate given the amount of available space around the pipe joint.

Figure 8:
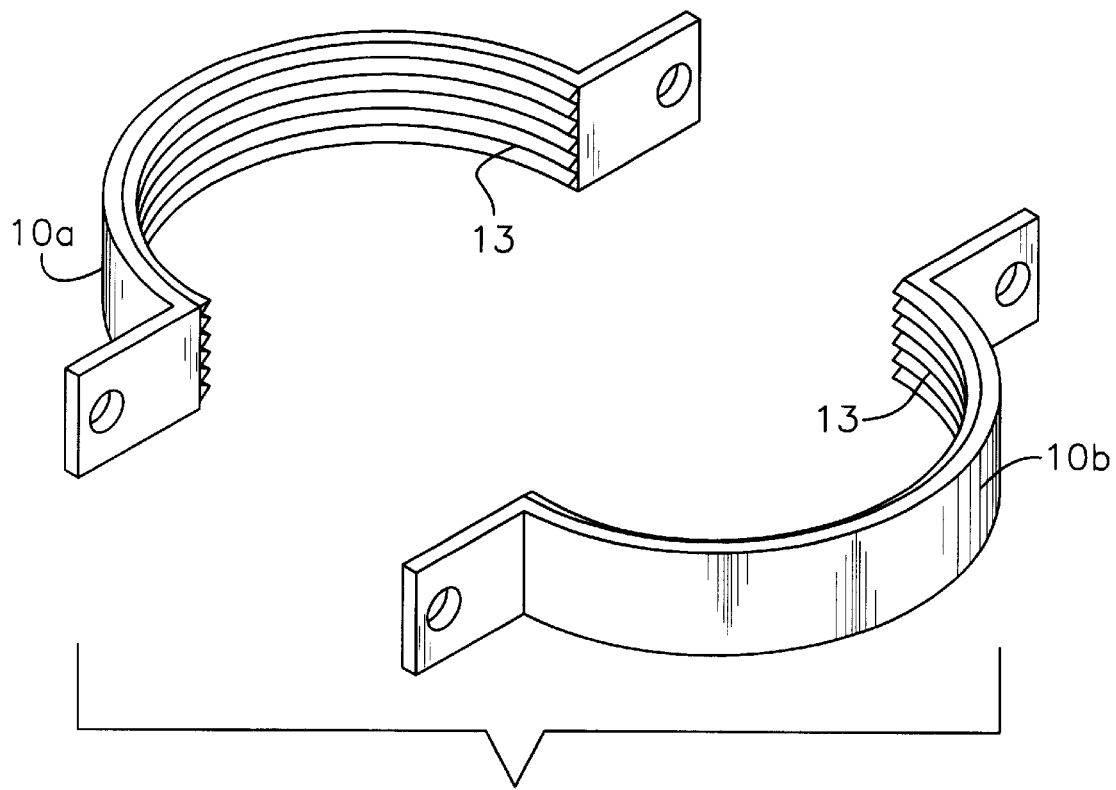
FIG. 8 is an elevated view in perspective of the disassembled clamp component of a preferred embodiment of this invention.

Numerous types of clamps may be employed in devices of this invention, and the selection of the type of clamp does not constitute a limitation of this invention, with the proviso that the clamp must be capable of gripping the substantially vertical pipe sufficiently so that at least some of the downward force applied by the vertical pipe to the pipe joint is transferred from the vertical pipe to the clamp. Suitable clamps include, for example, vice clamps, ring clamps, spring clamps, and the like. When the pipe being clamped is formed from plastic or thermoplastic (e.g., polyvinyl chloride), the clamp employed in devices of this invention preferably is threaded along the surface which contacts the pipe in a direction substantially perpendicular to the longitudinal axis of the pipe when installed thereon. The threads of such clamps are embedded into the pipe upon clamping to assist in establishing a firm attachment of the clamp to the pipe. Such a clamp is illustrated in FIG. 8, which shows clamp halves 10*a* and 10*b* of clamp 10. Each clamp half includes threading 13 along the inner surface of the clamp which comes into contact with and is at least partially embedded into the thermoplastic pipe being gripped.

While the base members of this invention illustrated in the attached figures are preferred, those of ordinary skill in the art will appreciate that the base members of this invention are not necessarily disposed below the pipe joint when in use, and may in fact be laterally disposed away from the bottom of the pipe joint or otherwise disposed away from the pipe joint, so long as the base member receives downward force from an arm member which is attached to the clamp. In addition, while a single base member is preferred, each arm member alternatively may have its own corresponding base member, or a base member may provide support for more than one but fewer than all of the arm members present on the device.

The components of the device of this invention may be fabricated from a wide variety of materials. Suitable materials include, for example, plastic, thermoplastic, wood, metal, and metal alloy. Preferred materials are metals and metal alloys on account of their strength and durability, with steel being particularly preferred. However, any material may be used so long as the material selected does not adversely affect the ability of the device to protect the pipe joint when in use for extended periods of time.

Likewise, the pipe and joint components of the improved system of this invention may be fabricated from any conventional material. Examples of suitable materials include plastic, thermoplastic, metal, and metal alloy, with plastics or thermoplastics, e.g., polyvinyl chloride, being preferred.

It will be understood that the device of this invention, and/or each of its individual parts, may have numerous different dimensions, depending upon the requirements of a given set of circumstances, so long as the dimensions do not substantially detract from the function and utility of the device.

This invention is susceptible to considerable variation in its practice. Therefore, the foregoing description is not intended to limit, and should not be construed as limiting, the invention to the particular exemplifications presented hereinabove. Rather, what is intended to be covered is as set forth in the ensuing claims and the equivalents thereof permitted as a matter of law.

What is claimed is:

1. A device for supporting a pipe joint which joins a substantially vertical pipe with at least one substantially horizontal pipe, the device comprising:
    a) a base member which defines at least one seat for receiving a portion of the pipe joint, the base member also comprising a first base member portion and a second base member portion, the base member portions being pivotally, or detachably, or pivotally and detachably attached to one another,
    b) a clamp sized and configured to clamp the vertical pipe, and
    c) at least one arm member which is attached at one end to the base member and attached at the other end to the clamp;

wherein at least a portion of the surface of the clamp which contacts the vertical pipe includes threading which runs in a direction substantially perpendicular to the longitudinal axis of the vertical pipe when the clamp is installed on the vertical pipe.

2. A device according to claim 1 wherein the base member further defines at least two seats for receiving a portion of the pipe joint.

3. A device according to claim 2 wherein the base member further comprises a substantially horizontal portion connecting each of the seats to one another.

4. A device according to claim 1 which comprises two arm members.

5. A device according to claim 1 wherein the arm member is detachably attached to the clamp.

6. A device for supporting a pipe joint which joins a substantially vertical pipe with at least one substantially horizontal pipe, the device comprising:
    a) a base member which defines at least one seat for receiving a portion of the pipe joint,
    b) a clamp sized and configured to clamp the vertical pipe, and
    c) at least one arm member which is pivotally, or detachably, or pivotally and detachably attached at one end to the base member and attached at the other end to the clamp;

wherein at least a portion of the surface of the clamp which contacts the vertical pipe includes threading which runs in a direction substantially perpendicular to the longitudinal axis of the vertical pipe when the clamp is installed on the vertical pipe.

7. A device according to claim 6 wherein the arm member is detachably attached to the clamp.

8. A device according to claim 6 wherein the base member defines at least two seats for receiving a portion of the pipe joint.

9. A device according to claim 8 wherein the base member comprises a substantially horizontal portion connecting each of the seats to one another.

10. A device for supporting a pipe joint which joins a substantially vertical pipe with at least one substantially horizontal pipe, the device comprising:
    a) a base member which defines at least two seats for receiving a portion of the pipe joint, the base member also comprising a substantially horizontal portion connecting each of the seats to one another and a first base member portion and a second base member portion, the base member portions being pivotally, or detachably, or pivotally and detachably attached to one another,
    b) a clamp sized and configured to clamp the vertical pipe, and
    c) at least one arm member which is attached at one end to the base member and attached at the other end to the clamp;

wherein at least a portion of the surface of the clamp which contacts the vertical pipe includes threading which runs in a direction substantially perpendicular to the longitudinal axis of the vertical pipe when the clamp is installed on the vertical pipe.

11. A device for supporting a pipe joint which joins a substantially vertical pipe with two substantially horizontal pipes, the device comprising:

a) a base member, b) a clamp sized and configured to clamp the vertical pipe, and c) two arm members each of which is pivotally, or detachably, or pivotally and detachably attached at one end to the base member and attached at the other end to the clamp;

wherein at least a portion of the surface of the clamp which contacts the vertical pipe includes threading which runs in a direction substantially perpendicular to the longitudinal axis of the vertical pipe when the clamp is installed on the vertical pipe.

12. A device according to claim 11 wherein the base member defines at least one seat for receiving a lower portion of the pipe joint.

13. A device according to claim 12 wherein each of the arm members is detachably attached to the clamp.

14. A device according to claim 12 wherein the base member defines at least two seats for receiving a lower portion of the pipe joint.

15. A device according to claim 14 wherein the base member comprises a substantially horizontal portion connecting each of the seats to one another.

16. A device according to claim 12 wherein the base member comprises a first base member portion and a second base member portion, the portions being pivotally, or detachably, or pivotally and detachably attached to one another.

17. A device for supporting a pipe joint which joins a substantially vertical pipe with two substantially horizontal pipes, the device comprising:

a) a base member which defines two seats for receiving a lower portion of the pipe joint, the base member comprising a substantially horizontal portion connecting each of the seats to one another, the base member further comprising a first base member portion and a second base member portion, the portions being pivotally, or detachably, or pivotally and detachably attached to one another, b) a clamp sized and configured to clamp the vertical pipe, at least a portion of the surface of the clamp which contacts the vertical pipe including threading which runs in a direction substantially perpendicular to the longitudinal axis of the vertical pipe when the clamp is installed on the vertical pipe, and c) two arm members each of which is attached at one end to the base member and detachably attached at the other end to the clamp.

18. A device for supporting a pipe joint which joins a substantially vertical pipe with two substantially horizontal pipes, the device comprising:

a) a base member which defines two seats for receiving a lower portion of the pipe joint, the base member comprising a substantially horizontal portion connecting each of the seats to one another, b) a clamp sized and configured to clamp the vertical pipe, at least a portion of the surface of the clamp which contacts the vertical pipe including threading which runs in a direction substantially perpendicular to the longitudinal axis of the vertical pipe when the clamp is installed on the vertical pipe, and c) two arm members each of which is pivotally, or detachably, or pivotally and detachably attached at one end to the base member and detachably attached at the other end to the clamp.

19. A method for supporting a pipe joint at which a substantially vertical pipe intersects with at least one substantially horizontal pipe, the method comprising attaching a threaded clamp to the vertical pipe, and connecting the clamp to a base member which is not above the pipe joint, the connection between the clamp and the base member being made by at least one arm member which is pivotally, or detachably, or pivotally and detachably attached to the base member, so that downward force may be transferred from the clamp to the base member.

20. In a system of underground pipes which comprises at least one substantially vertical pipe, at least one substantially horizontal pipe, and a pipe joint to which the substantially vertical pipe and the substantially horizontal pipe are connected, the improvement which comprises:

a) a base member, b) a clamp sized and configured to clamp the vertical pipe, and c) at least one arm member which is pivotally, or detachably, or pivotally and detachably attached at one end to the base member and attached at the other end to the clamp;

wherein at least a portion of the surface of the clamp which contacts the vertical pipe includes threading which runs in a direction substantially perpendicular to the longitudinal axis of the vertical pipe when the clamp is installed on the vertical pipe.

21. The improvement of claim 20 wherein the base member comprises a first base member portion and a second base member portion, the portions being pivotally, or detachably, or pivotally and detachably attached to one another.

22. The improvement of claim 20 wherein the base member defines at least two seats for receiving a portion of the pipe joint, and the base member comprises a substantially horizontal portion connecting each of the seats to one another.

* * * * *